April 18, 1939.    S. SPECKERT    2,155,337
TOOL HOLDER
Filed July 21, 1937
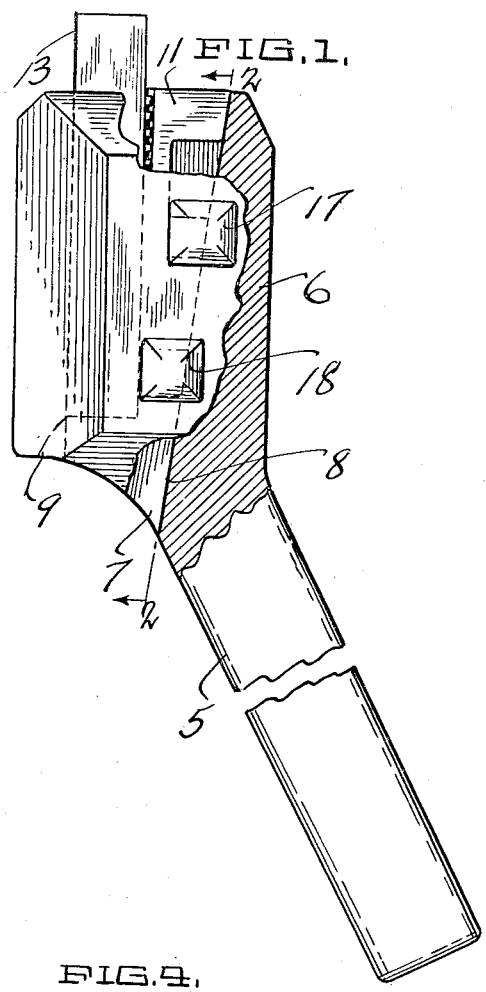
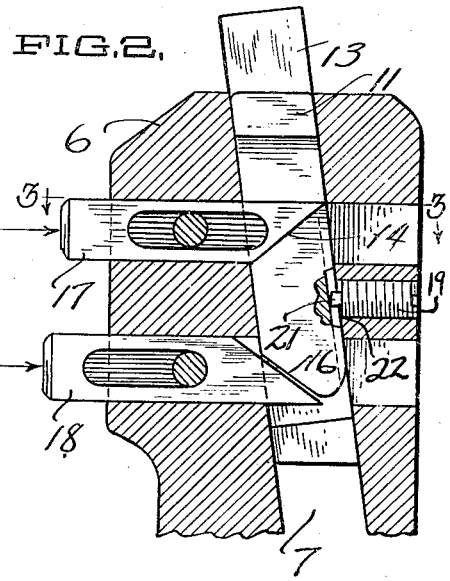
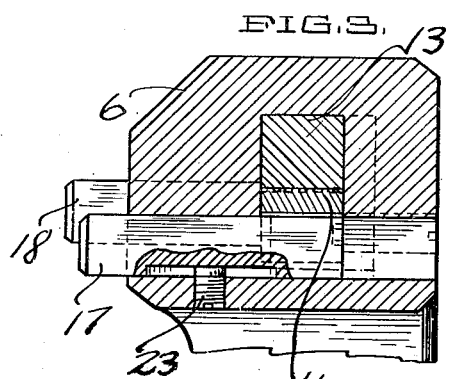
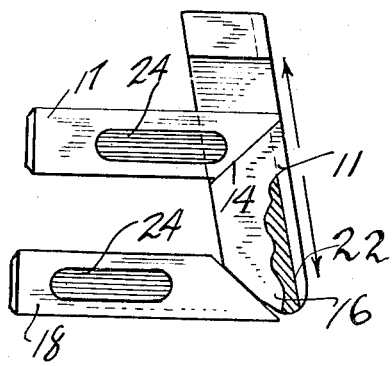
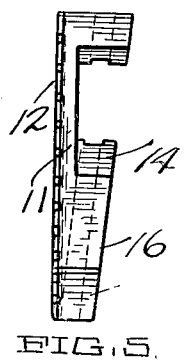
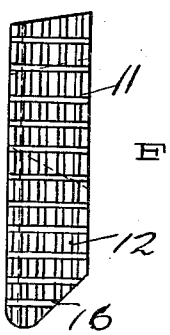
INVENTOR:
SIEGFRIED SPECKERT
BY Victor J. Evans & Co.
ATTORNEYS.

Patented Apr. 18, 1939

2,155,337

UNITED STATES PATENT OFFICE 2,155,337

TOOL HOLDER

Siegfried Speckert, South Gate, Calif.

Application July 21, 1937, Serial No. 154,897

2 Claims. (Cl. 29—96)

This invention relates to improvements in tool holders.

The principal object of this invention is to provide an automatic wedging and releasing means whereby the tool will be firmly held within the tool holder or released therefrom, if desired.

A further object is to produce a device of this character which conforms to standard practices of tool holders.

A further object is to produce a device which is economical to manufacture and one wherein the parts may not become jammed.

Other objects and advantages will be apparent during the course of the following description.

In the accompanying drawing forming a part of this specification and in which like numerals are employed to designate like parts throughout the same:

Fig. 1 is a top plan view of my device, showing a portion thereof broken away;

Fig. 2 is a fragmentary detailed view taken on the line 2—2 of Fig. 1;

Fig. 3 is a cross sectional view taken on the line 3—3 of Fig. 2;

Fig. 4 is a diagrammatic view, showing the manner in which the wedge may be actuated;

Fig. 5 is a side elevation of the wedge;

Fig. 6 is a top plan view of the wedge; and

Fig. 7 is a side elevation of one of the wedge actuating pins.

Tool holders are employed in lathes for the purpose of holding a small piece of hard cutting metal, whereby the cutting metal, when properly shaped and brought into engagement with the work, will cut metal from the work; and it is important that this tool holder be rigid so that the cutting metal will not wobble. Heretofore, it has been customary to employ threaded bolts to hold this cutting metal; and I have, therefore, devised a new method of holding the cutting metal, which includes a clamp or wedge shaped piece, which tends to tighten with the pressure upon the cutting metal; and I have devised means for quickly releasing this clamping action or tightening the same, as the case may be.

In the accompanying drawing wherein for the purpose of illustration is shown a preferred embodiment of my invention, the numeral 5 designates the shank of the tool holder; the numeral 6, the head thereof. Extending through the head is an opening 7 which is tapered along the side 8 and straight along the side 9, so that a wedge 11, when placed therein, will have one face thereof parallel with the side 9. This wedge is best shown in Figs. 4, 5, and 6. It will be noted that the face 12 of the wedge has a gripping surface which contacts the cutting tool 13. The wedge 11 is provided with cam surfaces 14 and 16, which are contacted by the cam faces of the wedge actuating pins 17 and 18 respectively. In order to prevent the wedge 11 from moving out of the tapered slot 7, I provide a screw 19 having a reduced end 21, which enters a slot 22 in the bottom of the wedge 11. Similar screws 23 enter slots 24 formed on the pins 17 and 18.

The operation of my device is as follows:

Assuming that the parts are arranged, as shown in Fig. 1, and that the tool 13 has been locked into position, and it is desired to remove the same, the wedge actuating pin 18 is driven downwardly with a tap from a hammer or other tool, and the same actuating the cam face 16, forces the wedge 11 forwardly, thus releasing the tool 13. At the same time, the pin 17 is cammed upwardly; and when it is desired to resecure the tool 13, then the pin 17 is struck, forcing the wedge 11 tightly against the tool, thus locking the same securely in place.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a tool holder having a head and a tapered slot formed through said holder, a tapered wedge positioned in said slot and adapted to engage a tool positioned in said slot, cam means for moving said wedge longitudinally of said slot, said cam means including a pair of wedge actuating pins having cam surfaces engaging cam surfaces of said wedge.

2. In a tool holder of the character described including a shank and a head, an opening formed through said head and tapered from end to end, a wedge positioned in said tapered opening and having a gripping surface parallel with one side of said opening and adapted to engage a tool bit positioned in said opening, an offset formed on said wedge, said offset having cam surfaces which when engaged will move said wedge longitudinally, whereby said parallel surfaces are maintained in proper relation, and a pair of independently actuated pins capable of engaging said cam surfaces to effect the longitudinal movement of said wedge.

SIEGFRIED SPECKERT.